(12) United States Patent
Armatorio et al.

(10) Patent No.: US 11,015,509 B2
(45) Date of Patent: May 25, 2021

(54) SYSTEMS AND APPARATUS TO GENERATE ELECTRICAL POWER FROM AIRCRAFT ENGINE HEAT

(71) Applicant: The Boeing Company, Chicago, IL (US)

(72) Inventors: Andrew L. Armatorio, Everett, WA (US); Richard Loftis, Arlington, WA (US)

(73) Assignee: The Boeing Company, Chicago, IL (US)

(*) Notice: Subject to any disclaimer, the term of this patent is extended or adjusted under 35 U.S.C. 154(b) by 114 days.

(21) Appl. No.: 16/366,683

(22) Filed: Mar. 27, 2019

(65) Prior Publication Data

US 2020/0309011 A1    Oct. 1, 2020

(51) Int. Cl.
*F01N 5/02* (2006.01)
*H02S 10/30* (2014.01)
*B64D 33/02* (2006.01)
*B64D 33/04* (2006.01)

(52) U.S. Cl.
CPC ............ *F01N 5/025* (2013.01); *B64D 33/02* (2013.01); *B64D 33/04* (2013.01); *H02S 10/30* (2014.12); *B64D 2033/0286* (2013.01)

(58) Field of Classification Search
CPC ........... F01N 5/25; H02S 10/30; B64D 27/10; B64D 33/02; B64D 33/04; B64D 2033/0286
USPC .................................................. 60/320, 782
See application file for complete search history.

(56) References Cited

U.S. PATENT DOCUMENTS

| 2009/0159110 A1* | 6/2009 | Kwok | F02C 6/14 136/205 |
| 2009/0266393 A1* | 10/2009 | Jahns | H01M 14/00 136/201 |
| 2014/0345281 A1* | 11/2014 | Galbraith | B60K 6/24 60/716 |

* cited by examiner

*Primary Examiner* — Audrey K Bradley
*Assistant Examiner* — Dapinder Singh
(74) *Attorney, Agent, or Firm* — Hanley, Flight & Zimmerman, LLC

(57) ABSTRACT

Systems and apparatus to generate electrical power from aircraft engine heat are described herein. An example aircraft engine described herein includes a gas turbine engine having an engine housing. The engine housing defines a flow path through a combustion chamber and a core exhaust cavity. The example aircraft engine also includes an energy-generating cell coupled to a portion of the engine housing defining the core exhaust cavity. The energy-generating cell is to generate electrical energy from high temperature fluid in the core exhaust cavity.

20 Claims, 6 Drawing Sheets

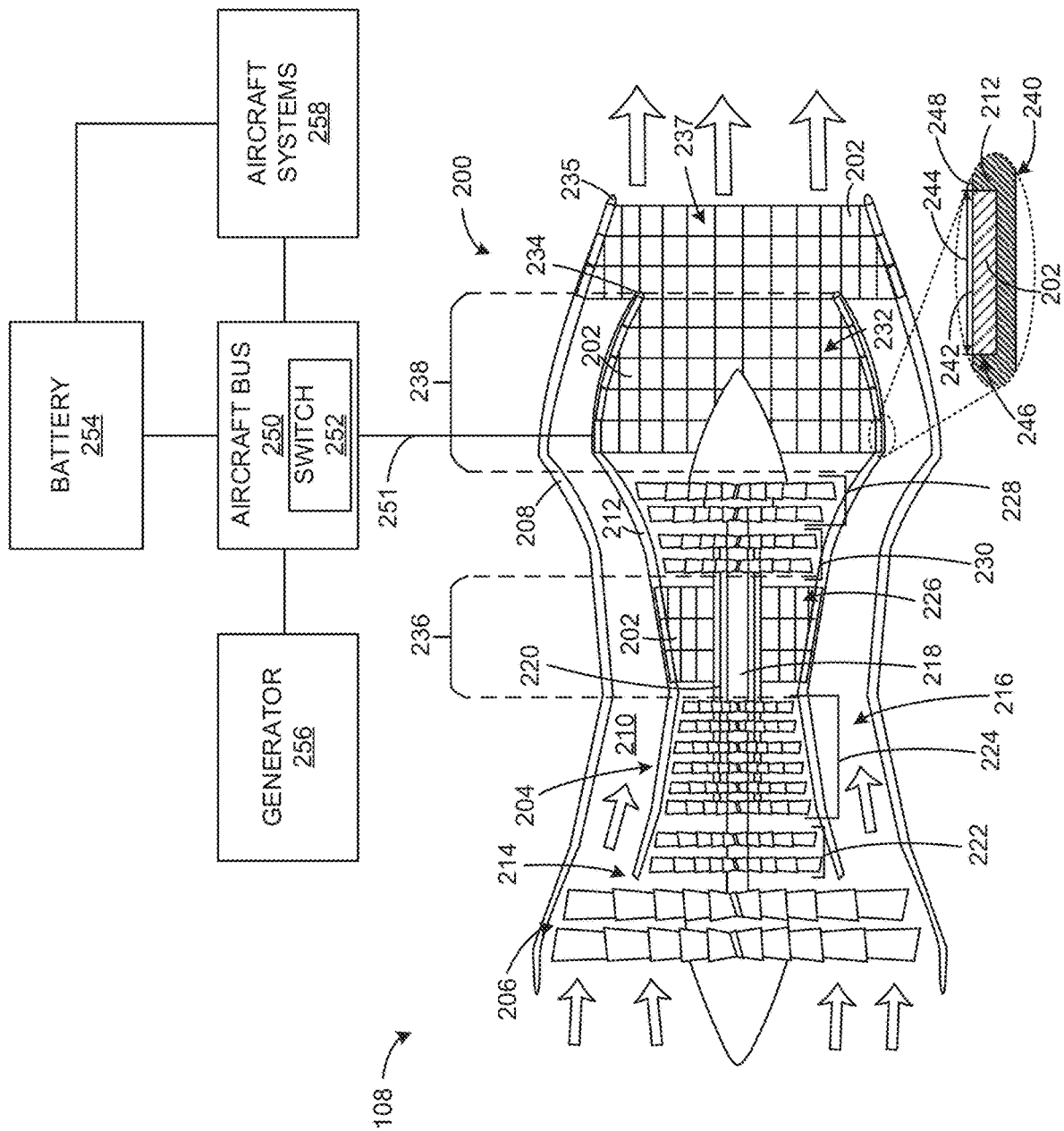

SYSTEMS AND APPARATUS TO GENERATE ELECTRICAL POWER FROM AIRCRAFT ENGINE HEAT

FIELD OF THE DISCLOSURE

This disclosure relates generally to aircraft and, more particularly, to systems and apparatus to generate electrical power from aircraft engine heat.

BACKGROUND

Aircraft typically include one or more engines to produce thrust. There are many different types or arrangements of engines, such as turbofan engines, turboprop engines, etc. These engines include a propulsor, such as a fan or propeller, for producing thrust and an engine core, such as a gas turbine engine, that drives the propulsor. The engine core generates high temperature fluid in a combustion chamber. While some of the high temperature energy of the fluid is converted into kinetic energy used to drive the propulsor, some of the high temperature energy is absorbed by components of the aircraft engine, such as a housing surrounding the components of the engine core.

SUMMARY

Disclosed herein is an example aircraft engine including a gas turbine engine having an engine housing. The engine housing defines a flow path through a combustion chamber and a core exhaust cavity. The example aircraft engine also includes an energy-generating cell coupled to a portion of the engine housing defining the core exhaust cavity. The energy-generating cell is to generate electrical energy from high temperature fluid in the core exhaust cavity.

Additionally, disclosed herein is an example aircraft including one or more aircraft systems that utilize electrical energy and an aircraft engine. The aircraft engine includes an energy-generating cell to generate electrical energy from high temperature fluid in the aircraft engine to be used by the one or more aircraft systems.

A system to generate electrical energy from an aircraft engine disclosed herein includes a first energy-generating cell to be coupled to a first portion of an engine housing of a gas turbine engine defining a combustion chamber. The system further includes a second energy-generating cell to be coupled to a second portion of the engine housing defining a core exhaust cavity. The first and second energy-generating cells are to generate electrical energy from high temperature fluid in the gas turbine engine.

BRIEF DESCRIPTION OF THE DRAWINGS

FIG. 2 is a cross-sectional view of one of the engines of the aircraft in FIG. 1 implemented with an example system having one or more thermophotovoltaic cells to generate electrical energy and constructed in accordance with the teachings of this disclosure.

Figure 1:
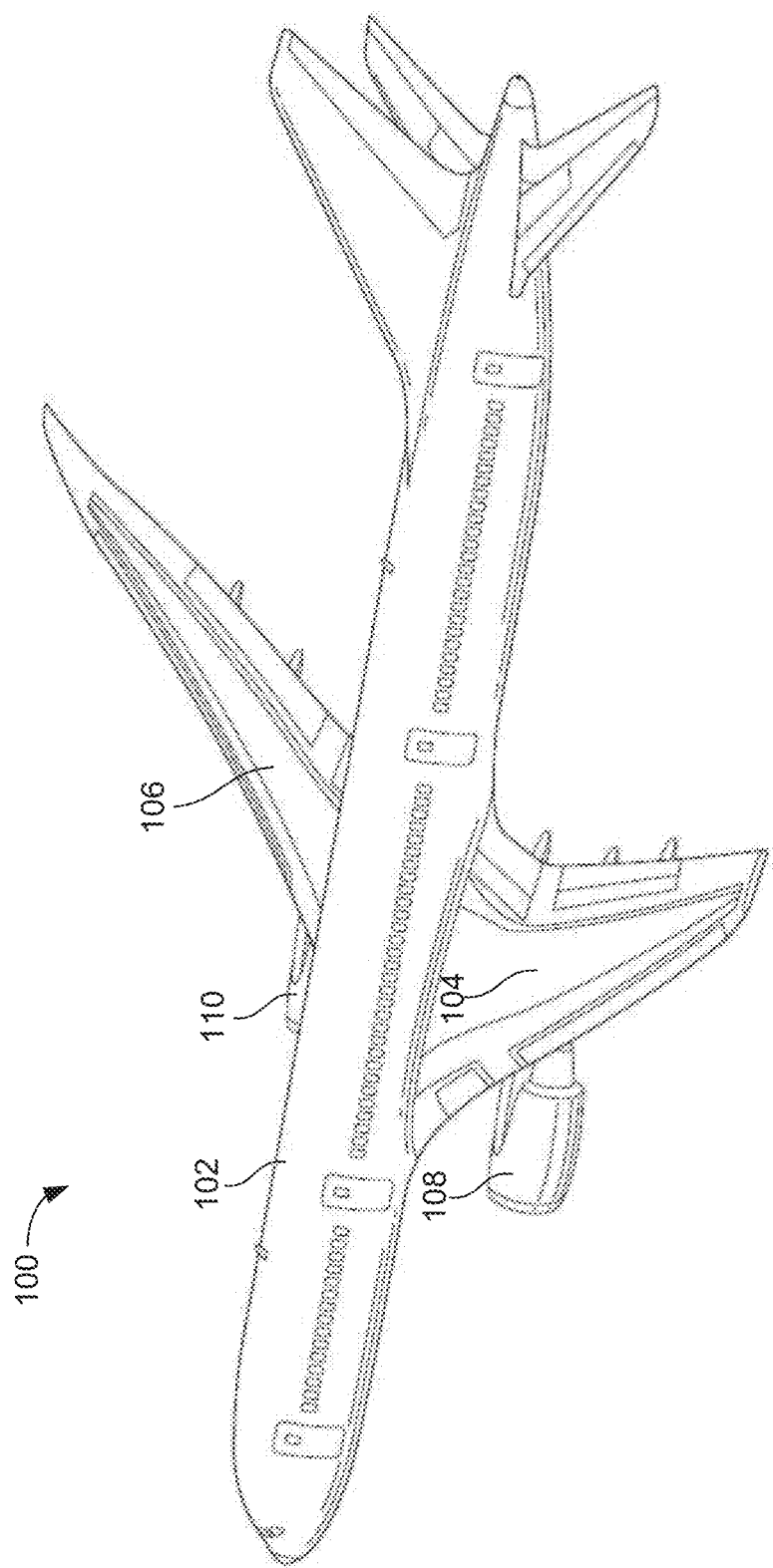
FIG. 1 illustrates an example aircraft in which the examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Aircraft, such as commercial planes, face increasing demand for electrical energy for powering different systems or components of the aircraft. For example, commercial planes require electrical energy for powering the systems that are responsible for operating the aircraft (e.g., flight control instruments, communication equipment, flight control actuators, landing gear, lights, etc.). These planes also face high demands to provide electrical energy for convenience and/or comfort to passengers of the aircraft (e.g., to charge personal devices, power interior lights of the cabin, power screens and speakers, etc.). To meet these electrical energy demands, aircraft include one or more generators that are powered by the aircraft engine(s). These generators are often large and heavy, which reduces fuel efficiency of the aircraft.

Aircraft engines, which power the previously mentioned generators, generate large amounts of heat energy. Some of this heat energy is converted into kinetic energy and used to produce thrust for propelling the aircraft. However, some of the heat energy is wasted. For example, heat in a combustion chamber or a core exhaust cavity of the aircraft engine is absorbed by a respective combustion chamber housing or an exhaust cavity housing. The heat absorbed by the combustion chamber housing and the exhaust cavity housing becomes heat waste and is not harnessed in known aircraft engines.

Disclosed herein are example systems and apparatus for generating electrical power from heat waste in an aircraft engine. Examples disclosed herein use one or more energy-generating cells, such as thermophotovoltaic cells and/or thermoelectric cells, to harness the heat energy from various components in an aircraft engine where heat energy is otherwise wasted, such as the combustion chamber housing and the exhaust cavity housing. In some examples, the energy-generating cell(s) is/are coupled to (e.g., embedded in) one or more portions of an engine housing defining the various chambers or cavities. As such, the energy-generating cell(s) are exposed to the high temperature energy in the aircraft engine. The generated electrical energy can be stored in a battery and/or otherwise used to power the various electrical systems of the aircraft. Therefore, less electrical energy is demanded by the generators, which enables the use of smaller, lighter generators and, thus, improves fuel efficiency of the aircraft.

FIG. 1 illustrates an example aircraft 100 in which the examples disclosed herein can be implemented. The aircraft 100 includes a fuselage 102, which defines a passenger cabin, a first wing 104 coupled to the fuselage 102, and a second wing 106 coupled to the fuselage 102. In the illustrated example, the aircraft 100 includes a first engine 108 (e.g., a turbofan engine) carried by the first wing 104 and a second engine 110 (e.g., a turbofan engine) carried by the second wing 106. In other examples, the aircraft 100 may include only one engine or may include more than two engines. The engine(s) can be coupled to the first and/or second wings 104, 106 and/or another structure on the aircraft 100 (e.g., on the tail section of the fuselage 102).

FIG. 2 shows a cross-sectional view of the first engine 108 implemented with an example system 200 to generate electrical energy from waste heat. In this example, the example system 200 includes one or more thermophotovoltaic cells 202 that generate electrical energy from high temperature fluid in the first engine 108, as disclosed in further detail herein. While the examples disclosed herein are described in connection with the first engine 108, it is understood that any of the examples disclosed herein can be similarly implemented in connection with the second engine 110 (FIG. 1).

In the illustrated example of FIG. 2, the first engine 108 is implemented as a turbofan engine. However, in other examples, the first engine 108 can be another type of engine, such as a turbo-prop engine, a turbojet engine, a piston engine, a Wankel engine, etc. The first engine 108 includes a gas turbine engine 204 (sometimes referred to as an engine core) and a fan 206. The gas turbine engine 204 is used to drive the fan 206 to produce thrust. The gas turbine engine 204 and the fan 206 are disposed within a nacelle 208 (which may also be referred to as a fan duct housing, engine casing, or cowling) of the first engine 108. The fan 206 rotates within the nacelle 208. As the fan 206 rotates, the fan 206 produces airflow (shown by the arrows in FIG. 2). At least a portion of the airflow produced by the fan 206 flows through a fan duct 210 (e.g., a bypass, a passageway, a channel, a nozzle duct, etc.) to produce forward thrust. The fan duct 210 is defined between the nacelle 208 and an engine housing 212 (e.g., a shroud) of the gas turbine engine 204.

The gas turbine engine 204 operates by drawing air through a core air intake 214 (at a fore end of the gas turbine engine 204) and into a compressor 216. In particular, when the gas turbine engine 204 is in operation, a portion of the airflow flows through the fan duct 210 and another portion of the airflow flows through the core air intake 214 and into the compressor 216 of the gas turbine engine 204. The compressor 216 can include multiple compressor sections. For example, the compressor 216 of FIG. 2 is a dual-axial compressor that includes two compressors, a first compressor 222 and a second compressor 224. Each of the first and second compressors 222, 224 includes various compressor stages that progressively increase the pressure of the air as the air flows from the core air intake 214 to a combustion chamber 226.

The first compressor 222 of the illustrated example is a low-pressure compressor (LPC) that provides relatively low pressure air and the second compressor 224 is a high-pressure compressor (HPC) that provides relatively high pressure air. The first compressor 222 is coupled to a first drive shaft 218 (sometimes referred to as a low speed spool or N1), and the second compressor 224 is coupled to a second drive shaft 220 (sometimes referred to as a high speed spool or N2). The first drive shaft 218 is coupled to the fan 206 (e.g., directly or indirectly coupled) to drive the fan 206 during operation of the first engine 108. The first drive shaft 218 (e.g., the LPC shaft) is coupled to and driven by a first turbine 228 (e.g., a low-pressure turbine) and the second drive shaft 220 (e.g., an HPC shaft) is coupled to and driven by a second turbine 230 (e.g., a high-pressure turbine). In this example, the compressor 216 is a dual-axial compressor that includes the two compressors 222, 224. However, in other examples, the compressor 216 can include more or fewer compressor sections, each coupled to a turbine via a respective shaft. Further, the compressor(s) 206, 222, 224 and the turbine(s) 228, 230 can be coupled directly or indirectly (e.g., via one or more gears, via a transmission or gearbox, etc.).

After exiting the second compressor 224 (the HPC), the highly pressurized air is provided to the combustion chamber 226, where fuel (e.g., from a fuel tank) is injected and mixed with the highly pressurized air and ignited. The high energy airflow exiting the combustion chamber 226 turns the blades of the first and second turbines 228, 230, which are coupled to respective ones of the first and second drive shafts 218, 220. The first drive shaft 218 extends through and rotates independently of the second drive shaft 220. As such, rotation of the first and second drive shafts 218, 220 turns the blades of the first and second compressors 222, 224, respectively. After the second turbine 230, the high temperature exhaust fluid (sometimes referred to as an exhaust plume) flows through a core exhaust cavity 232 and out a nozzle 234 of the gas turbine engine 204. The high temperature exhaust fluid mixes with the accelerated airflow provided by the fan 206 through the fan duct 210. The mixed airflow flows through an engine exhaust cavity 237 of the nacelle 208 and exits an exhaust nozzle 235 at an aft end of the nacelle 208 to produce forward thrust that propels the aircraft 100 of FIG. 1.

In the illustrated example of FIG. 2, the first compressor 222, the second compressor 224, the first and second drive shafts 218, 220, the first turbine 228, and the second turbine 230 are housed within the engine housing 212. The engine housing 212 defines a flow path between the core air intake 214 and the nozzle 234 and through the various sections of the gas turbine engine 204, including the first and second compressors 222, 224, the combustion chamber 226, the first and second turbines 228, 230, and the core exhaust cavity 232. As illustrated in FIG. 2, a first portion 236 of the engine housing 212 defines the combustion chamber 226 and a second portion 238 of the engine housing 212 defines the core exhaust cavity 232.

The example gas turbine engine 204 produces extremely high temperatures. For example, the fluid in the combustion chamber 226 may reach temperatures of approximately 2000° C. (2300K), which can produce temperatures between approximately 900° C. and 1100° C. (1200K to 1400K) along the first portion 236 of the engine housing 212. As another example, fluid exhaust (the exhaust plume) in the core exhaust cavity 232 may reach temperatures of between approximately 1300° C. and 1500° C. (between approximately 1600K and 1800K). The high temperature of the exhaust fluid causes a temperature along the second portion 238 of the engine housing 212 to reach a temperature of approximately 550° C. to 750° C. (850K to 1050K). Further, the high temperature exhaust fluid produces high temperatures along the portion of the nacelle 208 defining the engine exhaust cavity 237 (e.g., between the nozzle 234 of the gas turbine engine 204 and the exhaust nozzle 235 of the nacelle 208). These temperatures may vary based on a number of parameters of the first engine 108 and/or the aircraft 100, such as the type of engine (e.g., turbo-fan, turbojet, etc.), the size of engine, the operating speed of the engine, the type of aircraft, the altitude of the aircraft, etc.

In known aircraft engines, a portion of the high temperature heat generated by the gas turbine engine 204 is absorbed by the engine housing 212 and/or the nacelle 208. In particular, while a majority of the high energy heat (located centrally) in the combustion chamber 226 is used to drive the first and second turbines 228, 230 and produce thrust, some of the high energy heat near the engine housing 212 and/or nacelle 208 is wasted when the heat is absorbed by the engine housing 212 and/or the nacelle 208. Traditional aircraft engines thus fail to harness a significant portion of the high energy heat produced by the gas turbine engine 204.

To harness some of the wasted energy, the example system 200 of the first engine 108 includes the one or more thermophotovoltaic cells 202 disposed in one or more areas of the first engine 108 with high temperatures. The energy from the heat generated by the gas turbine engine 204 creates thermal emission (photons) at infrared (IR) wavelength. The amount of thermal emission may change depending on the throttle setting and other flight parameters. The thermophotovoltaic cells 202 generate electricity by converting IR photons to electricity. In particular, photons emitted by the high temperature fluid and/or components in the first engine 108 can be absorbed by the thermophotovoltaic cells 202 and converted to electrical energy. The thermophotovoltaic cells 202 may be disposed in various areas of the gas turbine engine 204. For example, as shown in FIG. 2, some of the thermophotovoltaic cells 202 are coupled to the first portion 236 of the engine housing 212 defining the combustion chamber 226 (one thermophotovoltaic cell is labeled in the first portion 236 in FIG. 2). Also, as shown in FIG. 2, some of the thermophotovoltaic cells 202 are coupled to the second portion 238 of the engine housing 212 defining the core exhaust cavity 232 (one thermophotovoltaic cell is labeled in the second portion 238 in FIG. 2). Further, some of the thermophotovoltaic cells 202 are coupled to the portion of the nacelle 208 defining the engine exhaust cavity 237 (e.g., at or near the exhaust nozzle 235). While in this example the first engine 108 includes thermophotovoltaic cells 202 in the combustion chamber 226, the core exhaust cavity 232, and the engine exhaust cavity 237, in other examples, the thermophotovoltaic cells 202 may be disposed in only one or two of these areas. Additionally or alternatively, thermophotovoltaic cells 202 may be disposed in other areas of the first engine 108. For example, one or more thermophotovoltaic cells can be disposed in one or more of the compressors 222, 224, one or more of the turbines 228, 230, in the fan duct 210 upstream from the engine exhaust cavity 237, in the fan duct 210 at or near the location of the fan 206, and/or in any other area of the first engine 108 where the thermophotovoltaic cells may be exposed to IR photons.

The thermophotovoltaic cells 202 generate power based on the temperature of the fluid in the respective sections. Higher temperature fluids or objects emit photons having more energy than photons emitted by fluids or objects at cooler temperatures. Throughout the first engine 108, the thermophotovoltaic cells 202 can be exposed to fluid between 400° C. and 2000° C. Depending on the cells used and where the cells are mounted, tens to hundreds of kilo-watts (kW) of electricity may be generated. For example, the thermophotovoltaic cells 202 disposed in the combustion chamber 226 of the engine housing 212 can be exposed to fluid at temperatures around 2000° C. As another example, the thermophotovoltaic cells 202 disposed in the core exhaust cavity 232 of the engine housing 212 can be exposed to fluid at temperatures around 800° C. The thermophotovoltaic cells 202 disposed in the engine exhaust cavity 237 can be exposed fluid at temperatures around 400° C. Depending on the parameters or settings of the first engine 108, the heat (and, thus, the amount thermal emission) may be higher or lower through the various sections of the first engine 108. The thermophotovoltaic cells 202 are relatively durable and can withstand the high temperatures in the first engine 108 without degrading.

Therefore, the thermophotovoltaic cells 202 coupled to the first portion 236 of the engine housing 212 (defining the combustion chamber 226) may produce a greater amount of power than those coupled to the second portion 238 of the engine housing 212 (defining the core exhaust cavity 232) due to the higher temperatures in the combustion chamber 226. Similarly, the thermophotovoltaic cells 202 coupled to the portion of the nacelle 208 defining the engine exhaust cavity 237 may generate less power than the thermophotovoltaic cells 202 coupled to the first and second portions 236, 238 of the engine housing 212. The thermophotovoltaic cells 202 do not impact the engine parameters and power output of the first engine 108. Further, the thermophotovoltaic cells 202 are passive. As such, the first engine 108 can be operated as normal. The thermophotovoltaic cells 202 only absorb energy that would otherwise be absorbed by the engine housing 212 and wasted.

In the example of FIG. 2, the nacelle 208 and the engine housing 212 have generally circular cross-sections. The thermophotovoltaic cells 202 are embedded throughout the nacelle 208 and the engine housing 212 around the respective sections. This arrangement of the thermophotovoltaic cells 202 allows the thermophotovoltaic cells 202 to capture the photons in the combustion chamber 226, the core exhaust cavity 232, and the engine exhaust cavity 237 regardless of the direction of travel of the photons.

In this example, the thermophotovoltaic cells 202 in the first portion 236 are arranged in rings, with multiple rings arranged from fore to aft. Only a portion of the rings are shown in the cross-sectional view of the first engine 108 in FIG. 2. However, in other examples, more or fewer rings of the thermophotovoltaic cells 202 may be utilized. In some examples, only one ring of thermophotovoltaic cells 202 may be implemented. In such an example, the thermophotovoltaic cells may be relatively long and extend from the compressor 216 to the first turbine 228. The thermophotovoltaic cells 202 can be adjacent to and in contact with each other, or can be spaced apart from each other with sections of the engine housing 212 between adjacent ones of the thermophotovoltaic cells 202. In the illustrated example, the thermophotovoltaic cells 202 have a generally rectangular or square shape. However, in other examples, the thermophotovoltaic cells 202 may be shaped differently (e.g., circular, triangular, etc.). Further, while in the illustrated example multiple thermophotovoltaic cells 202 are coupled to the first portion 236 of the engine housing 212, in other examples, more or fewer thermophotovoltaic cells are utilized. In some examples, only one thermophotovoltaic cell may be coupled to the first portion 236 of the engine housing 212. The various example arrangements and number of thermophotovoltaic cells 202 disclosed above in connection with the first portion 236 of the engine housing 212 can likewise apply to the thermophotovoltaic cells 202 coupled to the second portion 238 of the engine housing 212 and/or the thermophotovoltaic cells 202 coupled to the portion of the nacelle 208 defining the exhaust cavity 237.

An example of one of the thermophotovoltaic cells 202 is shown in further detail in the callout 240 in FIG. 2. The callout 240 of FIG. 2 is an enlarged cross-section of one of the thermophotovoltaic cells 202 coupled to the second portion 238 of the engine housing 212. However, it is understood that any of the example thermophotovoltaic cells 202 coupled to the first portion 236 of the engine housing 212 and/or the portion of the nacelle 208 defining the exhaust cavity 237 (e.g., at the exhaust nozzle 235) can be similarly structured and/or arranged. As shown in the callout 240, the thermophotovoltaic cell 202 is embedded in the engine housing 212. The thermophotovoltaic cell 202 has a collector surface 242 having a surface area 244 that captures photons emitted from the heated fluid in the core exhaust cavity 232. In some examples, the thermophotovoltaic cell 202 abuts one or more other thermophotovoltaic cells 202 on either side (e.g., in the circumferential direction, upstream, downstream, etc.). In such examples, the surface area of the thermophotovoltaic cells 202 is maximized to capture the maximum number of photons, thus producing the maximum amount of energy from the heat. Additionally or alternatively, such as shown in the callout 240, the thermophotovoltaic cell 202 can be spaced from an adjacent thermophotovoltaic cell 202, having a portion of the engine housing 212 separating the thermophotovoltaic cells 202.

The thermophotovoltaic cell 202 shown in the callout 240 is disposed within an example recess 246 formed in an inner surface 248 of second portion 238 of the engine housing 212. In this example, a thickness of the thermophotovoltaic cell 202 is the same as the depth of the recess 246. As such, the collector surface 242 is aligned (e.g., flush, even) with an inner surface 248 of the engine housing 212 adjacent the thermophotovoltaic cell 202. Additionally or alternatively, the collector surface 242 can be aligned with another exposed surface of an abutting thermophotovoltaic cell. Therefore, in some examples, only the collector surface 242 of the thermophotovoltaic cell 202 is exposed to fluids flowing through the core exhaust cavity 232.

The thermophotovoltaic cell 202 shown in the callout 240 is embedded in the engine housing 212 so that only the collector surface 242 is exposed fluid in the core exhaust cavity 232. The side surfaces of the thermophotovoltaic cell 202 approximately perpendicular to the collector surface 242 are not exposed to fluid in the core exhaust cavity 232. In other examples, the thermophotovoltaic cell 202 can be partially embedded in the engine housing 212 or affixed to a surface of the engine housing 212 such that a portion of the side surfaces are exposed. For example, the thermophotovoltaic cell 202 can be partially embedded in the engine housing 212 where the collector surface 242 is spaced above the inner surface 248 of the engine housing 212 such that at least a portion of the side surfaces are exposed. In some such examples, the side surfaces of the thermophotovoltaic cell 202 function as collector surfaces that generate energy from photons of heated fluid. The thermophotovoltaic cell 202 may be coupled to the engine housing 212 using, for example, adhesives, mechanical fasteners (e.g., screws, bolts, etc.), welding, brazing, shrink fitting, etc. In this example, the thermophotovoltaic cells 202 are directly coupled to and in contact with the engine housing 212. In other examples, the thermophotovoltaic cells 202 could be coupled via one or more intermediary structures.

In the illustrated example, the thermophotovoltaic cells 202 are electrically coupled to an aircraft bus 250 of the aircraft 100 (FIG. 1). The aircraft bus 250 may include, for example, wires, cables, connectors, etc. that electrically couple the thermophotovoltaic cells 202 to one or more systems of the aircraft 100. In some examples, the thermophotovoltaic cells 202 are electrically coupled to each other (e.g., via one or more wires to form one or more groups) to form a network of thermophotovoltaic cells 202. In such examples, the network of thermophotovoltaic cells 202 is electrically coupled to a circuit, which is further electrically coupled to the aircraft bus 250 via a single connection point (e.g., as shown in FIG. 2). For example, a circuit can be electrically coupled to the aircraft bus 250 via a main electrical connection 251 (e.g., a single wire or cable, multiple wires or cables, etc.). In some examples, the main electrical connection 251 extends through a support (e.g., a web) extending between the gas turbine engine 204 and the nacelle 208. In some examples, it may be desired to electrically disconnect the thermophotovoltaic cells 202 from the one or more systems of the aircraft 100. Therefore, in some examples, a switch 252 is provided to connect or disconnect the thermophotovoltaic cells 202 to the aircraft bus 250, depending on whether the aircraft bus 250 is to receive power from the thermophotovoltaic cells 202.

The aircraft bus 250 facilitates use of the electrical energy generated by the thermophotovoltaic cells 202 throughout the aircraft 100. The aircraft bus 250 of the illustrated example is further electrically coupled to a battery 254, a generator 256 associated with the first engine 108, and one or more aircraft systems 258 of the aircraft 100 (FIG. 1). In some alternative examples, the thermophotovoltaic cells 202 are directly coupled (e.g., via the main electrical connection 251) to the battery 254, the generator 256, and/or one or more of the aircraft systems 258 without using the aircraft bus 250. The aircraft systems 258 may include any systems or components in the aircraft 100 that utilize electrical power, such as the flight control instruments, the flight control surface actuators, lights, communication equipment, screens or displays, electrical outlets, the landing gear actuators, etc. The generator 256 may be powered by, for example, a drive shaft (e.g., an auxiliary drive shaft) extending from one of the first or second drive shafts 218, 220 and/or bleed air from the gas turbine engine 204. The generator 256 generates electrical power that is also used for the aircraft systems 258. In some examples, the aircraft bus 250 provides the electrical energy from the generator 256 and/or the thermophotovoltaic cells 202 to the battery 254 to store the electrical energy for later use (e.g., to be routed to the aircraft systems 258 by the battery 254). Additionally or alternatively, the electrical energy from the generator 256 and/or the thermophotovoltaic cells 202 can be routed directly to the aircraft systems 258.

The power generated by the thermophotovoltaic cells 202 reduces demand on the generator 256, which enables the size of the generator 256 to be reduced, thereby decreasing the weight and/or cost of the generator 256. A reduction in the weight of the generator 256 can further lead to increased fuel efficiency of the aircraft 100. Further, by reducing the demand on the generator 256, less power from first engine 108 is used to drive the generator 256, which further increases the efficiency of the aircraft 100. Also, the power from the thermophotovoltaic cell(s) 202 reduces the demand on other energy sources (e.g., generators, batteries, etc.) of a specified aircraft system 258 and/or provides all power needed by the aircraft system 258. The size and cost of the batteries and/or generators used to power one or more of the aircraft systems 258 can thereby be decreased based on the power received from the thermophotovoltaic cells 202.

Figure 3A:
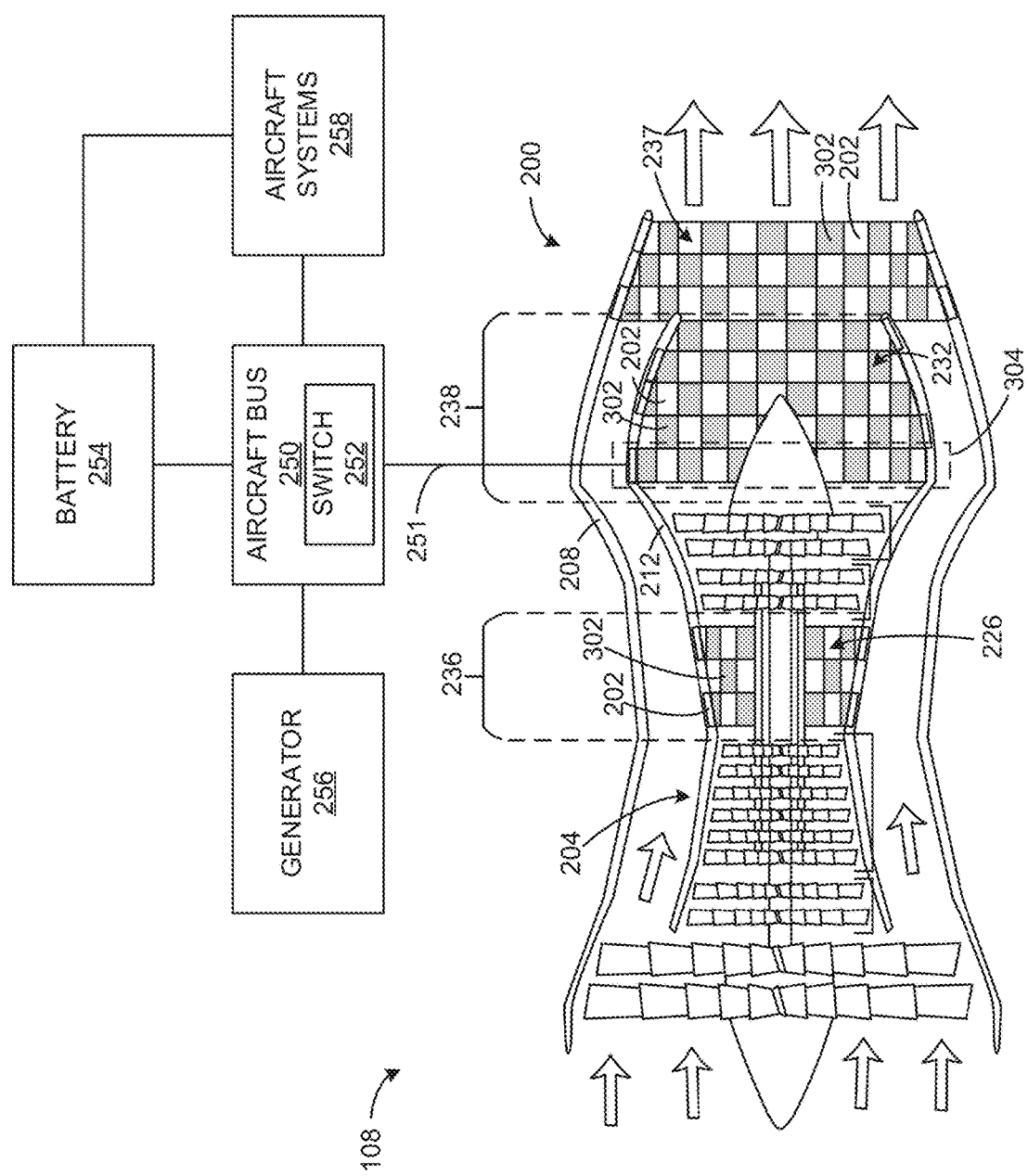
FIG. 3A is a cross-sectional view of one of the engines of the aircraft in FIG. 1 implemented with the thermophotovoltaic cell(s) of FIG. 2 and one or more reflective surface(s) constructed in accordance with the teachings of this disclosure.

In some examples, one or more reflective surfaces may be disposed in the engine housing 212 and/or the nacelle 208 to reflect photons emitted by the hot fluids toward the thermophotovoltaic cells 202. The reflection of these photons can lead to an increase in the number of photons absorbed by each of the thermophotovoltaic cells 202. Further, using reflective surfaces reduces the number of thermophotovoltaic cells needed to surround an area (e.g., the combustion chamber 226). For example, FIG. 3A is a cross-sectional view of the first engine 108 of FIGS. 1 and/or 2 that includes reflective surfaces 302 (shown in grey shading). The first engine 108 of the illustrated example of FIG. 3A includes substantially the same components as the illustrated example of FIG. 2 and, therefore, the components of the first engine 108 are not discussed again in connection with FIG. 3A. Instead, the interested reader is referred to the above corresponding descriptions. To facilitate this process, the same reference numbers are used for like structures. In the illustrated example, the first engine 108 includes the thermophotovoltaic cells 202 and the reflective surfaces 302 coupled to the first portion 236 of the engine housing 212, the second portion 238 of the engine housing 212, and the portion of the nacelle 208 defining the engine exhaust cavity 237. One reflective surface 302 is referenced in each of the first portion 236, the second portion 238, and the portion of the nacelle 208 defining the engine exhaust cavity 237.

In some examples, the thermophotovoltaic cells 202 and the reflective surfaces 302 are arranged in an alternating pattern (e.g., each thermophotovoltaic cell 202 is disposed next to one of the reflective surfaces 302 on each side of the thermophotovoltaic cell 202 and vice versa). The reflective surfaces 302 reflect photons toward thermophotovoltaic cells 202 disposed opposite the respective reflective surfaces 302. For example, a reflective surface 302 between a first and second thermophotovoltaic cell 202 may reflect photons toward a third thermophotovoltaic cell 202 disposed opposite the first and second thermophotovoltaic cells 202. The thermophotovoltaic cells 202 and the reflective surfaces 302 form a series of circumferential rings 304 (one of which is referenced in FIG. 3A) around the combustion chamber 226, the core exhaust cavity 232, and the engine exhaust cavity 237. The circumferential rings 304 of the illustrated example are rings of the thermophotovoltaic cells 202 and the reflective surfaces 302 that are disposed throughout a circumferential periphery of the combustion chamber 226, the core exhaust cavity 232, and/or the engine exhaust cavity 237.

Alternatively, the thermophotovoltaic cells 202 and the reflective surfaces 302 can be arranged in a different pattern. For example, each circumferential ring 304 can be composed entirely of thermophotovoltaic cells 202 or entirely of reflective surfaces 302. In some such examples, the circumferential rings 304 can alternate between rings of thermophotovoltaic cells 202 and reflective surfaces 302. In another example arrangement, multiple thermophotovoltaic cells 202 (e.g., two, three, four, etc.) can be disposed next to one another (e.g., in the circumferential ring 304) and can be separated by one or more reflective surfaces 302. For example, a circumferential ring 304 can include a pattern of two thermophotovoltaic cells 202 followed by a single reflective surface 302, and this pattern can be repeated throughout the circumferential ring 304.

The reflective surfaces 302 of the illustrated example increase the energy generation of the thermophotovoltaic cells 202 by reflecting photons that contact the reflective surfaces 302 toward other thermophotovoltaic cells 202. For example, a photon that contacts one of the reflective surfaces 302 can rebound off of the reflective surface 302 and, remaining energized, can contact one of the thermophotovoltaic cells 202 where the photon is absorbed and used to generate energy. The reflective surfaces 302 therefore allow the thermophotovoltaic cells 202 to absorb additional photons that would instead be absorbed by, for example, the engine housing 212 and/or the nacelle 208. The reflective surfaces 302 can be, for example, a polished metal capable of withstanding the high temperatures in the first engine 108. Additionally or alternatively, the reflective surfaces 302 can be glass mirrors produced by coating glass in aluminum, silver, and/or any other reflective material. In some examples, the mirror has a flat surface, while in other examples the mirror can be convex or concave.

The thermophotovoltaic cells 202 of FIG. 3A, as discussed in connection with the callout 240 of FIG. 2, can be disposed in a recess (e.g., the recess 246 (FIG. 2)) such that only the collector surfaces 242 (FIG. 2) of the thermophotovoltaic cells 202 are exposed to fluids flowing through the first engine 108 (e.g., a surface opposite the collector surface 242 is not exposed to fluid in the first engine 108). The collector surfaces 242 may be aligned with the adjacent reflective surfaces 302.

The power generated by the thermophotovoltaic cells 202 of FIG. 3A is transferred to the aircraft bus 250 (e.g., via the main electrical connection 251), as discussed in connection with FIG. 2. The aircraft bus 250 can distribute the electrical energy received from the thermophotovoltaic cells 202 to the battery 254 and/or the aircraft systems 258. In some examples, the switch 252 can be turned on to allow the aircraft bus 250 to receive the power generated by the thermophotovoltaic cells 202 or can be turned off to prevent power generation by the thermophotovoltaic cells 202.

Figure 3B:
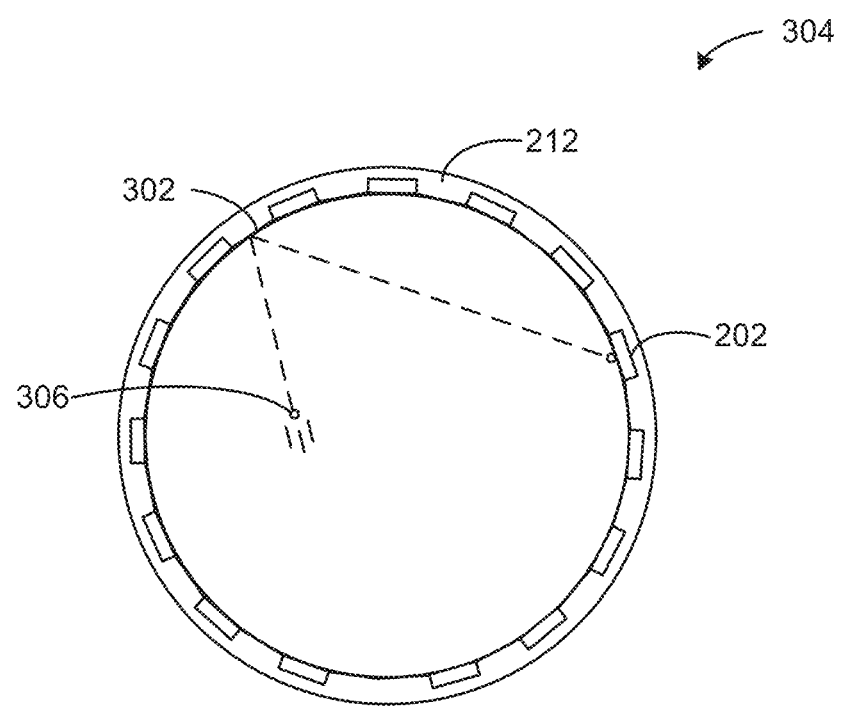
FIG. 3B is a cross-sectional view of the engine of FIG. 3A showing an example circumferential ring of the thermophotovoltaic cell(s) and the reflective surface(s).

FIG. 3B is a cross-sectional view of the engine housing 212 of FIG. 3A showing one of the example circumferential rings 304. In the illustrated example of FIG. 3B, the circumferential ring 304 includes an alternating pattern of thermophotovoltaic cells 202 (one of which is referenced in FIG. 3B) and reflective surfaces 302 (one of which is referenced in FIG. 3B). In some examples, a photon 306 can be reflected off of one of the reflective surfaces 302 toward one of the thermophotovoltaic cells 202. In such examples, the reflected photon 306 is absorbed by the thermophotovoltaic cell 202, thereby increasing the total energy generated by the thermophotovoltaic cell 202. In the illustrated example, the thermophotovoltaic cells 202 alternate with the reflective surfaces 302 along the engine housing 212. Alternatively, the circumferential ring 304 could include only thermophotovoltaic cells 202 or only reflective surfaces 302. In another example arrangement, multiple thermophotovoltaic cells 202 (e.g., two, three, four, etc.) can be disposed next to one another (e.g., in the circumferential ring 304) and can be separated by one or more reflective surfaces 302.

Figure 4:
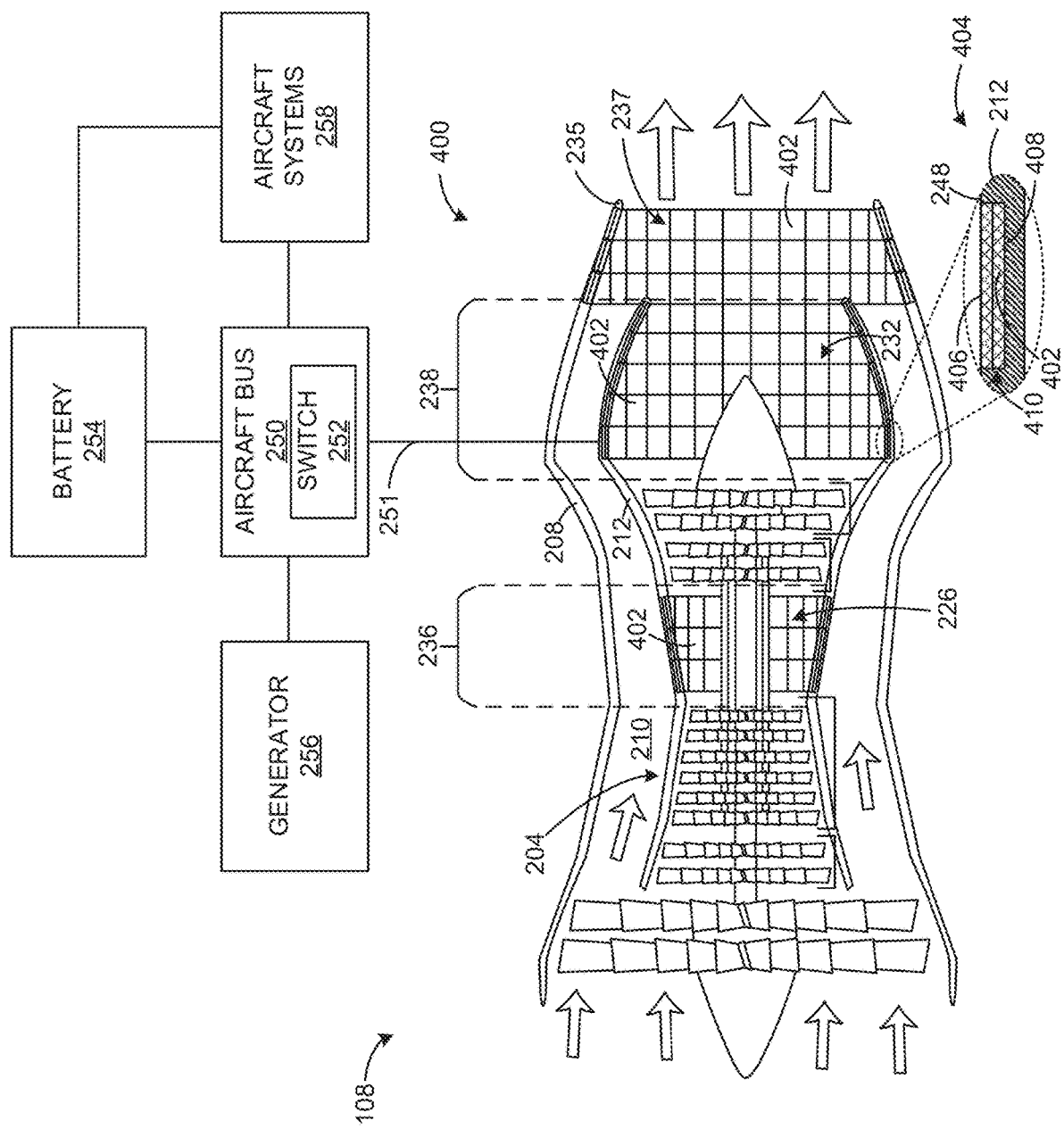
FIG. 4 is a cross-sectional view of one of the engines of the aircraft of FIG. 1 implemented with an example system having one or more thermoelectric cells to generate electrical energy and constructed in accordance with the teachings of this disclosure.

FIG. 4 is a cross-sectional view of the first engine 108 implemented with an example system 400 to generate electrical energy from waste heat. In this example, the example system 400 includes one or more thermoelectric cells 402 that generate electrical energy from high temperature fluid in the first engine 108, as disclosed in further detail herein. The first engine 108 of the illustrated example of FIG. 4 includes substantially the same components as the illustrated example of FIG. 2 and, therefore, the components of the first engine 108 are not discussed again in connection with FIG. 4. Instead, the interested reader is referred to the above corresponding descriptions. To facilitate this process, the same reference numbers are used for like structures.

The thermoelectric cells 402 operate by generating electrical energy when a temperature differential exists between two sides of the thermoelectric cell 402. In particular, the thermoelectric cells 402 convert the temperature differential between opposite sides of the thermoelectric cells 402 into electrical energy through an effect known as the thermoelectric effect, Peltier effect, Seebeck effect, and/or Peltier-Seebeck effect. The thermoelectric effect establishes that, when there is a temperature differential between two sides of the thermoelectric cell 402 (e.g., a hot side and a cold side), charge (positive or negative) flows from the higher-temperature side of the thermoelectric cell 402 to the lower-temperature side. This flow of electrons creates a potential difference between the two sides and, as a result, a voltage can be output by the thermoelectric cell 402. In the illustrated example, the thermoelectric cells 402 are coupled to the first portion 236 of the engine housing 212 defining the combustion chamber 226, the second portion 238 of the engine housing 212 defining the core exhaust cavity 232, and the portion of the nacelle 208 defining the engine exhaust cavity 237. The thermoelectric cells 402 coupled to the first portion 236 and the second portion 238 generate energy from a temperature differential between the high temperature fluid within the engine housing 212 and the lower temperature fluid in the fan duct 210. The thermoelectric cells 402 coupled to the portion of the nacelle 208 defining the engine exhaust cavity 237 generate energy from a temperature differential between the fluid in engine exhaust cavity 237 and the fluid in the atmosphere external to the first engine 108 (which can be much colder than the fluid in the fan duct 210). In other examples, the thermoelectric cells 402 may be disposed in only one or two of these areas. Additionally or alternatively, thermoelectric cells may be disposed in other areas of the first engine 108, such as one or more the compressors 222, 224 (FIG. 2), one or more of the turbines 228, 230 (FIG. 2), in the fan duct 210 upstream from the engine exhaust cavity 237, in the fan duct 210 at or near the location of the fan 206, and/or in any other area of the first engine 108 where the thermoelectric cells may be exposed to a temperature differential.

One of the example thermoelectric cells 402 from the second portion 238 of the engine housing 212 is shown in more detail in the callout 404. In the illustrated example, the thermoelectric cell 402 has a first side 406 and a second side 408 opposite the first side 406. The thermoelectric cell 402 produces electricity when a temperature differential exists between the first side 406 and the second side 408. The thermoelectric cell 402 is arranged such that first side 406 faces toward the core exhaust cavity 232 and the second side 408 faces toward the fan duct 210 disposed around the engine housing 212. Thus, the first side 406 is subjected to the higher temperatures in the core exhaust cavity 232, and the second side 408 is subjected to the lower temperatures in the fan duct 210.

In some examples, the thermoelectric cell 402 abuts one or more other thermoelectric cells 402 on either side. Additionally or alternatively, the thermoelectric cell 402 can be spaced from an adjacent thermoelectric cell, having a portion of the engine housing 212 separating each of the thermoelectric cells 402.

In some examples, the thermoelectric cell 402 is embedded in the engine housing 212. For example, the thermoelectric cell 402 shown in the callout 404 is disposed in an example recess 410 formed in the inner surface 248 of the engine housing 212. In this example, the first side 406 of the thermoelectric cell 402 is directly exposed to the fluids flowing through the core exhaust cavity 232.

In the illustrated example, the depth of the recess 410 is substantially the same as the thickness of the thermoelectric cell 402. As such, the first side 406 is aligned with (e.g., flush with) the inner surface 248 of the engine housing 212. Additionally or alternatively, the first side 406 can be aligned with a corresponding first side of an abutting thermoelectric cell.

However, in some alternative examples, the thermoelectric cell 402 can be partially embedded in the recess 410 of the engine housing 212 or affixed the inner surface 248 of the engine housing 212 such that the first side 406 is not aligned with the inner surface 248 of the engine housing 212 or the nacelle 208, partially exposing sides of the thermoelectric cell 402 that are approximately perpendicular to the first side 406.

In the illustrated example, the second side 408 of the thermoelectric cell 402 is in contact with the inner surface 248 of the engine housing 212 in the recess 410. The cooler temperatures from the fan duct 210 are transmitted through the portion of the engine housing 212 to the second side 408 of the thermoelectric cell 402. The thermoelectric cells 402 of the illustrated example do not alter the operation or power output of the first engine 108 and/or the gas turbine engine 204. The thermoelectric cells 402 are passive, and only react to the temperature changes that would otherwise be absorbed by the engine housing 212 and/or the nacelle 208.

The thermoelectric cell 402 can be fixed to the inner surface 248 of the engine housing 212 using, for example, adhesives, mechanical fasteners, etc. While the thermoelectric cell 402 in the callout 404 is described in connection with the second portion 238 of the engine housing 212, the description above can likewise be applied to the thermoelectric cells 402 coupled to the first portion 236 of the engine housing 212 and/or the portion of the nacelle 208 defining the exhaust cavity 237 (e.g., at the exhaust nozzle 235).

As discussed in connection with FIG. 2, fluid temperatures along the second portion 238 of the engine housing 212 can reach temperatures of approximately 800° C. (1070K). The first side 406 of the thermoelectric cell 402 is subjected to temperatures at or near these temperatures, while the second side 408 of the thermoelectric cell 402 experiences temperatures that are near temperatures of the fluid flowing in the fan duct 210 (e.g., temperatures near ambient temperature or 400° C.). The thermoelectric cells 402 coupled to the first portion 236 of the engine housing 212 defining the combustion chamber 226 experience a greater temperature differential. Tens of kilowatts can be generated by the thermoelectric cells 402 disposed in the first portion 236, the second portion 238, and/or the portion of the nacelle 208 defining the exhaust cavity 237 (e.g., at the exhaust nozzle 235). The power generated by the thermoelectric cell 402 can be higher or lower when the temperature differential increases or decreases, respectively. Further, more or less power can be generated by the thermoelectric cells 402 based on factors in addition to the temperature differential between the first side 406 and the second side 408, such as the material properties of the thermoelectric cells 402, a surface area of the thermoelectric cells 402, and/or any other characteristics of the thermoelectric cells 402.

The power generated by the thermoelectric cells 402 of FIG. 4 is transferred to the aircraft bus 250, as discussed in connection with FIG. 2. The aircraft bus 250 can distribute the electrical energy received from the thermoelectric cells 402 to the battery 254 and/or the aircraft systems 258. In some examples, the switch 252 can be turned on to allow the aircraft bus 250 to receive the power generated by the thermoelectric cells 402 or be turned off to prevent the aircraft bus 250 from receiving power generated by the thermoelectric cells 402. In some alternative examples, the thermoelectric cells 402 are directly coupled (e.g., via the main electrical connection 251) to the battery 254, the generator 256, and/or one or more of the aircraft systems 258 without using the aircraft bus 250.

Figure 5A:
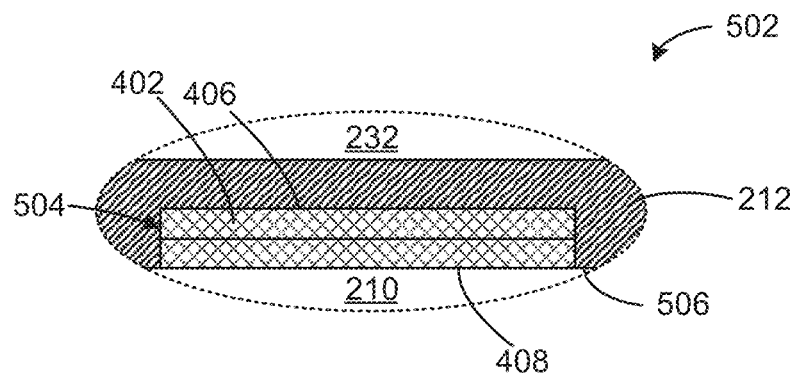
FIGS. 5A-5C are cross-sectional views showing various configurations of one of the thermoelectric cells of FIG. 4 implemented in connection with an engine housing of the engine.
Figure 5B:
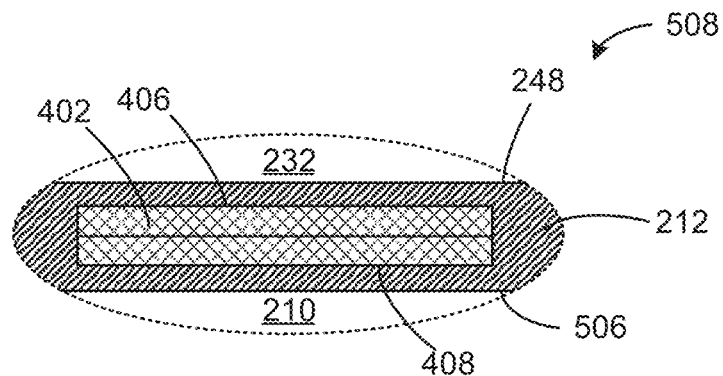
Figure 5C:
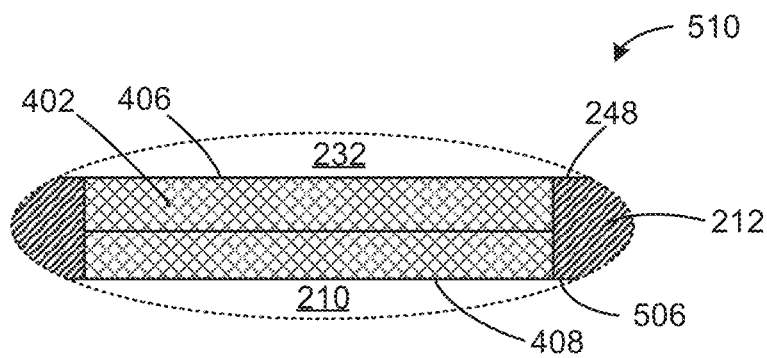

Although the callout 404 of FIG. 4 illustrates the first side 406 of the thermoelectric cell 402 as being aligned with the inner surface 248 of the engine housing 212, several alternative configurations of the thermoelectric cell 402, such as those illustrated in FIGS. 5A-5C, can be implemented in the examples disclosed herein. FIGS. 5A-5C are cross-sectional views of the engine housing 212 and thermoelectric cell 402 of FIG. 4 having different configurations. In configuration 502 of FIG. 5A, the thermoelectric cell 402 is disposed in a recess 504 formed in an outer surface 506 of the engine housing 212 such that the second side 408 of the thermoelectric cell 402 is aligned (e.g., flush, even) with the outer surface 506 of the engine housing 212. In the illustrated example of FIG. 5A, the first side 406 of the thermoelectric cell 402 is in contact with the engine housing 212 and is subjected to the temperatures of the core exhaust cavity 232 through the engine housing 212.

In configuration 508 of FIG. 5B, the thermoelectric cell 402 is completely encased in the engine housing 212. In some examples, the thermoelectric cell 402 is equidistant from the inner surface 248 and the outer surface 506 of the engine housing 212. In configuration 510 of FIG. 5C, the thermoelectric cell 402 has a thickness equal to a thickness of the engine housing 212. In such an example, the first side 406 of the thermoelectric cell 402 can be aligned (e.g., flush, even) with the inner surface 248 of the engine housing 212 and the second side 408 can be aligned (e.g., flush, even) with the outer surface 506 of the engine housing 212. In some such examples, the first side 406 is exposed to fluid in the core exhaust cavity 232 and the second side 408 is exposed to fluid in the fan duct 210.

In some examples, the first engine 108 can include both thermophotovoltaic cells 202, as disclosed in connection with FIGS. 2 and 3, and thermoelectric cells 402, as disclosed in connection with FIG. 4. In some examples, one type of energy-generating cell is used in one area, such as the combustion chamber 226, while the other type of energy-generating cell is used in another area, such as the core exhaust cavity 232. For example, the thermoelectric cells 402 can be coupled to the first portion 236 of the engine housing 212 and thermophotovoltaic cells 202 can be coupled to the second portion 238 of the engine housing 212 or vice versa. In another example, one or more thermophotovoltaic cells 202 and one or more thermoelectric cells 402 can be used in the same area. For example, one or more thermophotovoltaic cells 202 and one or more thermoelectric cells 402 can be coupled to first portion 236 of the engine housing 212 defining the combustion chamber 226. In such examples, the electrical energy produced by the thermophotovoltaic cell(s) 202 and the thermoelectric cell(s) 402 can be transferred to the aircraft bus 250 to be routed to the battery 254 and/or the aircraft systems 258.

While the example systems and energy-generating cells disclosed herein are described in connection with aircraft engines, the example systems and energy-generating cells can be similarly implemented in connection with other aircraft systems. For example, energy-generating cells can be similarly incorporated into different section of an auxiliary power unit (APU) or an air condition pack. The energy-generating cells can be used to produce electrical power from heat waste in these systems.

The example systems and energy-generating cells disclosed herein can also be implemented in connection with engines of other types of vehicles, such as boats, trains, cars, and/or any other vehicle to generate energy from the waste heat of the vehicle engine.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

From the foregoing, it will be appreciated that example methods, systems, apparatus and articles of manufacture have been disclosed that generate electrical power from aircraft engine heat. Examples disclosed herein use thermophotovoltaic and/or thermoelectric cells to generate power from waste heat generated by an aircraft engine without altering or inhibiting the function of the aircraft engine. The examples disclosed herein advantageously use heat generated by the aircraft engine that is typically wasted and generate power using either the photons emitted by the heated fluids in the engine of the aircraft (e.g., when using thermophotovoltaic cells) or a temperature differential created by the high-temperature fluids (e.g., when using the thermoelectric cells). The power generated by the thermophotovoltaic cells and/or the thermoelectric cells disclosed herein can thus be used to power various electrical systems of the aircraft, such as flight control systems, landing gear systems, and systems within the aircraft cabin. In some examples, the power generated by the examples disclosed herein enables a generator and/or a battery supplying power to other aircraft systems to be reduced in size and weight, leading to an increase in fuel efficiency of the aircraft. The reductions in power demand of the generators and/or batteries can further lead to reductions in cost of the respective generators and/or batteries. Further, if a generator fails, the energy-generating cells can operate as a back-up to continue to supply electrical power. Thus, the examples disclosed herein improve reliability, and reduce fuel burn, and provide environment benefits.

The following paragraphs provide various examples of the examples disclosed herein.

Example 1 includes an aircraft engine comprising a gas turbine engine having an engine housing. The engine housing defines a flow path through a combustion chamber and a core exhaust cavity. The aircraft engine also includes an energy-generating cell coupled to a portion of the engine housing defining the core exhaust cavity. The energy-generating cell is to generate electrical energy from high temperature fluid in the core exhaust cavity.

Example 2 includes the aircraft engine of Example 1, wherein the energy-generating cell is a thermophotovoltaic cell. The thermophotovoltaic cell is to generate electrical energy from photons emitted by the high temperature fluid in the core exhaust cavity.

Example 3 includes the aircraft engine of Example 2, wherein the thermophotovoltaic cell is disposed in a recess formed in an inner surface of the portion of the engine housing such that a collector surface of the thermophotovoltaic cell is aligned with the inner surface of the portion of the engine housing.

Example 4 includes the aircraft engine of Example 2, wherein the thermophotovoltaic cell is a first thermophotovoltaic cell, further including a second thermophotovoltaic cell coupled to the portion of the engine housing defining the core exhaust cavity.

Example 5 includes the aircraft engine of Example 4, further including a reflective surface disposed between the first and second thermophotovoltaic cells. The reflective surface is to reflect photons toward a third thermophotovoltaic cell disposed opposite the first and second thermophotovoltaic cells.

Example 6 includes the aircraft engine of Example 1, wherein the energy-generating cell is a thermoelectric cell. The thermoelectric cell is to generate energy from a temperature differential between a first side of the thermoelectric cell and a second side of the thermoelectric cell opposite the first side.

Example 7 includes the aircraft engine of Example 6, wherein the first side of the thermoelectric cell faces toward the core exhaust cavity and the second side of the thermoelectric cell faces toward a fan duct disposed around the engine housing.

Example 8 includes the aircraft engine of Example 1, wherein the energy-generating cell is a first energy-generating cell, further including a second energy-generating cell coupled to a portion of the engine housing defining the combustion chamber.

Example 9 includes the aircraft engine of Example 8, further including a nacelle. The gas turbine engine is disposed in the nacelle. A fan duct is formed between the engine housing of the gas turbine engine. A portion the nacelle defines an exhaust cavity. The aircraft engine further includes a third energy-generating cell coupled to the portion of the nacelle defining the exhaust cavity.

Example 10 includes an aircraft comprising one or more aircraft systems that utilize electrical energy and an aircraft engine including an energy-generating cell to generate electrical energy from high temperature fluid in the aircraft engine to be used by the one or more aircraft systems.

Example 11 includes the aircraft of Example 10, wherein the energy-generating cell is a thermophotovoltaic cell or a thermoelectric cell.

Example 12 includes the aircraft of Example 10, wherein the aircraft engine includes a gas turbine engine, and wherein the gas turbine engine includes an engine housing. The energy-generating cell is coupled to a portion of the engine housing defining a core exhaust cavity.

Example 13 includes the aircraft of Example 12, wherein the energy-generating cell is a first energy-generating cell, further including a second energy-generating cell coupled to a portion of the engine housing defining a combustion chamber.

Example 14 includes the aircraft of Example 10, further including a battery. The energy-generating cell is electrically coupled to the battery. The battery is to store the electrical energy generated by the energy-generating cell.

Example 15 includes the aircraft of Example 14, wherein the energy-generating cell is electrically coupled to at least one of the battery or the one or more aircraft systems via a bus.

Example 16 includes the aircraft of Example 10, wherein the aircraft engine is a turbofan engine.

Example 17 includes the aircraft of Example 10, further including a generator to generate electrical energy. The generator is driven by the aircraft engine.

Example 18 includes a system to generate electrical energy from an aircraft engine. The system comprises a first energy-generating cell to be coupled to a first portion of an engine housing of a gas turbine engine defining a combustion chamber, and a second energy-generating cell to be coupled to a second portion of the engine housing defining a core exhaust cavity. The first and second energy-generating cells are to generate electrical energy from high temperature fluid in the gas turbine engine.

Example 19 includes the system of Example 18, wherein at least one of the first energy-generating cell or the second energy-generating cell is a thermophotovoltaic cell or a thermoelectric cell.

Example 20 includes the system of Example 18, wherein the second energy-generating cell is disposed in a recess of the engine housing having a depth the same as a thickness of the second energy-generating cell.

Although certain example methods, systems, apparatus and articles of manufacture have been disclosed herein, the scope of coverage of this patent is not limited thereto. On the contrary, this patent covers all methods, systems, apparatus and articles of manufacture fairly falling within the scope of the claims of this patent.

What is claimed is:

1. An aircraft engine comprising:
a gas turbine engine having an engine housing, the engine housing defining a flow path through a combustion chamber and a core exhaust cavity; and
an energy-generating cell coupled to a portion of the engine housing defining the core exhaust cavity, the energy-generating cell disposed on an inner surface of the engine housing such that the energy-generating cell is exposed to a high temperature fluid in the core exhaust cavity, the energy-generating cell to generate electrical energy from the high temperature fluid in the core exhaust cavity.

2. The aircraft engine of claim 1, wherein the energy-generating cell is a thermophotovoltaic cell, the thermophotovoltaic cell to generate electrical energy from photons emitted by the high temperature fluid in the core exhaust cavity.

3. The aircraft engine of claim 2, wherein the thermophotovoltaic cell is disposed in a recess formed in the inner surface of the portion of the engine housing such that a collector surface of the thermophotovoltaic cell is aligned with the inner surface of the portion of the engine housing.

4. The aircraft engine of claim 2, wherein the thermophotovoltaic cell is a first thermophotovoltaic cell, further including a second thermophotovoltaic cell coupled to the portion of the engine housing defining the core exhaust cavity.

5. The aircraft engine of claim 4, further including a reflective surface disposed between the first and second thermophotovoltaic cells, the reflective surface to reflect photons toward a third thermophotovoltaic cell disposed opposite the first and second thermophotovoltaic cells.

6. The aircraft engine of claim 1, wherein the energy-generating cell is a thermoelectric cell, the thermoelectric cell to generate energy from a temperature differential between a first side of the thermoelectric cell and a second side of the thermoelectric cell opposite the first side.

7. The aircraft engine of claim 6, wherein the first side of the thermoelectric cell faces toward the core exhaust cavity and the second side of the thermoelectric cell faces toward a fan duct disposed around the engine housing.

8. The aircraft engine of claim 1, wherein the energy-generating cell is a first energy-generating cell, further including a second energy-generating cell coupled to a portion of the engine housing defining the combustion chamber.

9. The aircraft engine of claim 8, further including:
a nacelle, the gas turbine engine disposed in the nacelle, a fan duct formed between the engine housing of the gas turbine engine, a portion the nacelle defining an exhaust cavity; and
a third energy-generating cell coupled to the portion of the nacelle defining the exhaust cavity.

10. An aircraft comprising:
one or more aircraft systems that utilize electrical energy; and
an aircraft engine including:
a gas turbine engine having an engine housing, the engine housing defining a flow path through a combustion chamber and a core exhaust cavity; and
a plurality of energy-generating cells and a plurality of reflective surfaces coupled to the engine housing and arranged in a circumferential ring around a portion of the engine housing defining the combustion chamber or the core exhaust cavity, the circumferential ring including an alternating sequence of the energy-generating cells and the reflective surfaces, the energy-generating cells to generate electrical energy from high temperature fluid in the aircraft engine to be used by the one or more aircraft systems.

11. The aircraft of claim 10, wherein the energy-generating cells include thermophotovoltaic cells.

12. The aircraft of claim 10, wherein the portion of the engine housing defines the core exhaust cavity, wherein the plurality of energy-generating cells is a first plurality of energy-generating cells, wherein the plurality of reflective surfaces is a first plurality of reflective surfaces, and wherein the circumferential ring is a first circumferential ring, further including a second plurality of energy-generating cells and a second plurality of reflective surfaces coupled to the engine housing and arranged in a second circumferential ring around a portion of the engine housing defining the combustion chamber.

13. The aircraft of claim 10, further including a battery, the energy-generating cells electrically coupled to the battery, the battery to store the electrical energy generated by the energy-generating cells.

14. The aircraft of claim 13, wherein the energy-generating cells are electrically coupled to at least one of the battery or the one or more aircraft systems via a bus.

15. The aircraft of claim 10, wherein the aircraft engine is a turbofan engine.

16. The aircraft of claim 10, further including a generator to generate electrical energy, the generator driven by the aircraft engine.

17. The aircraft of claim 10, wherein the plurality of energy-generating cells is a first plurality of energy-generating cells, the plurality of reflective surfaces is a first plurality of reflective surfaces, and the circumferential ring is a first circumferential ring, further including a second plurality of energy-generating cells and a second plurality of reflective surfaces coupled to the engine housing and arranged in a second circumferential ring around the portion of the engine housing, the second circumferential ring disposed axially upstream or downstream of the first circumferential ring.

18. A system to generate electrical energy from an aircraft engine, the system comprising:
a first energy-generating cell to be coupled to a first portion of an engine housing of a gas turbine engine of the aircraft engine, the first portion of the engine housing defining a combustion chamber, the aircraft engine including a nacelle, the gas turbine engine disposed in the nacelle such that a fan duct is formed between the engine housing and the gas turbine engine, a portion the nacelle extending aft of the gas turbine engine and defining an engine exhaust cavity;
a second energy-generating cell to be coupled to a second portion of the engine housing, the second portion of the engine housing defining a core exhaust cavity; and
a third energy-generating cell to be coupled to the portion of the nacelle defining the engine exhaust cavity, the first, second, and third energy-generating cells to generate electrical energy from high temperature fluid in the aircraft engine.

19. The system of claim 18, wherein at least one of the first energy-generating cell, the second energy-generating cell, or the third energy-generating cell is a thermophotovoltaic cell or a thermoelectric cell.

20. The system of claim 18, wherein the second energy-generating cell is disposed in a recess of the engine housing having a depth the same as a thickness of the second energy-generating cell.

* * * * *